US007915334B2

(12) United States Patent
Anderson et al.

(10) Patent No.: US 7,915,334 B2
(45) Date of Patent: Mar. 29, 2011

(54) DUAL PURPOSE RECEIVER SHEET

(75) Inventors: Brian L. Anderson, Westfield, MA (US); Simon Roberto Cuch, East Longmeadow, MA (US)

(73) Assignee: Kanzaki Specialty Papers, Inc., Ware, MA (US)

( * ) Notice: Subject to any disclaimer, the term of this patent is extended or adjusted under 35 U.S.C. 154(b) by 177 days.

(21) Appl. No.: 11/559,173

(22) Filed: Nov. 13, 2006

(65) Prior Publication Data

US 2008/0113126 A1 May 15, 2008

(51) Int. Cl.
*C08K 3/36* (2006.01)

(52) U.S. Cl. ........................................ 524/493; 524/487

(58) Field of Classification Search .................. 524/487, 524/493

See application file for complete search history.

(56) References Cited

U.S. PATENT DOCUMENTS

| | | | | |
|---|---|---|---|---|
| 5,198,306 | A | 3/1993 | Kruse | |
| 5,198,406 | A * | 3/1993 | Mack et al. | 503/207 |
| 5,202,205 | A | 4/1993 | Malhota | |
| 5,244,714 | A | 9/1993 | Malhotra et al. | |
| 5,278,127 | A * | 1/1994 | Dombrowski et al. | 503/207 |
| 5,296,447 | A | 3/1994 | Suto et al. | |
| 5,407,771 | A | 4/1995 | Landa et al. | |
| 5,612,281 | A * | 3/1997 | Kobayashi et al. | 428/32.11 |
| 5,858,516 | A | 1/1999 | Ou-Yang | |
| 5,939,193 | A | 8/1999 | Katsen et al. | |
| 6,015,603 | A | 1/2000 | Ou-Yang | |
| 6,171,769 | B1 * | 1/2001 | Majumdar et al. | 430/529 |
| 6,245,421 | B1 * | 6/2001 | Aurenty et al. | 428/304.4 |
| 6,743,480 | B1 | 6/2004 | Almog et al. | |
| 6,761,940 | B2 | 7/2004 | Kammerer et al. | |
| 6,767,588 | B2 | 7/2004 | Almog et al. | |
| 6,783,847 | B1 * | 8/2004 | Minami et al. | 428/331 |
| 6,849,312 | B1 * | 2/2005 | Williams | 428/32.81 |
| 6,890,397 | B1 | 5/2005 | Weirather et al. | |
| 6,977,101 | B2 | 12/2005 | Landa et al. | |
| 2002/0012790 | A1 * | 1/2002 | Shah et al. | 428/331 |
| 2003/0003276 | A1 | 1/2003 | Mizuhara et al. | |
| 2003/0114573 | A1 * | 6/2003 | Cuch et al. | 524/492 |
| 2003/0180478 | A1 * | 9/2003 | Fruge et al. | 428/31 |
| 2003/0180541 | A1 * | 9/2003 | Naik et al. | 428/423.1 |
| 2003/0224192 | A1 * | 12/2003 | Tani et al. | 428/485 |
| 2004/0185361 | A1 * | 9/2004 | Yoshino et al. | 430/108.1 |
| 2004/0209010 | A1 * | 10/2004 | Cuch | 428/32.24 |
| 2005/0008794 | A1 * | 1/2005 | Graczyk et al. | 428/32.24 |
| 2005/0013947 | A1 * | 1/2005 | Merkel et al. | 428/32.34 |
| 2005/0026779 | A1 | 2/2005 | Omata et al. | |

(Continued)

OTHER PUBLICATIONS http://www.rsc.org/chemistryworld/Issues/2003/March/inkchemistry.asp.*

(Continued)

*Primary Examiner* — David Wu
*Assistant Examiner* — Vu A Nguyen
(74) *Attorney, Agent, or Firm* — Holland & Bonzagni, P.C.; Mary R. Bonzagni

(57) ABSTRACT

A dual purpose receiver sheet suitable for use in both digital offset printing presses and xerographic (dry toner) printers and presses, is provided. The inventive receiver sheet employs a microporous toner receiving layer(s) prepared from fine particles in combination with at least one film forming binder, these components being present within a fixed ratio range. The inventive dual purpose receiver sheet with microporous toner receiving layer(s) exhibits good heat stability and good to excellent adhesion to both liquid toners used in digital offset presses and dry toners used in xerographic printing systems.

22 Claims, 1 Drawing Sheet

U.S. PATENT DOCUMENTS

2005/0129880 A1 6/2005 Spice et al.
2007/0092666 A1* 4/2007 Hood et al. ................ 428/32.34

OTHER PUBLICATIONS

KFDA @ http://fa.kfda.go.kr/standard/egongjeon__standard__view.jsp?SerialNo=420&GoCa=1 (Aug. 2009).*
Richard J. Lewis, Sr. "Hawley's Condensed Chemical Dictionary, 12th Edition", John Wiley & Sons, Inc., New York (Title page front and back, and p. 1034) (1993).*
Gerashchenko et al. Can. J. Microbiol. 48: 170-175 (2002).*
Google search result for Ludox SM-30 particle size (May 14, 2010).*
McPhillips et al. International Journal of Pharmaceutics, 1999, 180(1), 83-90. (Abstract only).*

* cited by examiner

DUAL PURPOSE RECEIVER SHEET

FIELD OF THE INVENTION

The present invention basically relates to a dual purpose receiver sheet suitable for use in both digital offset printing presses and xerographic (dry toner) printers and presses.

BACKGROUND OF THE INVENTION

Digital offset printing presses use an offset cylinder to transfer a color image to a paper, film or metal substrate. These presses are based on an electrophotographic process where an electrostatic image is formed on a surface of a charged photo-conductor by exposing the surface to a light and shadow image to dissipate the charge on areas of the photo-conductor surface exposed to the light. A charged electrostatic latent image is then developed using ink (liquid toner) containing an opposite charge to that on the electrostatic latent image. The resulting electrostatic toner image is then transferred to a hot blanket, where the toner is coalesced and maintained in a tacky state until it is transferred to the substrate, which cools the ink and produces a tack-free print.

Conventional digital offset receiving sheets are typically highly cationic in nature, are not thermally stable at temperatures above 200° C., and commonly employ a substrate prepared using a polyamine or quaternary ammonium polymer.

Xerography is an electrophotographic technique that uses electrostatic charges, dry ink (toner) and a fusing process to produce and fix an image on a substrate. A negative of an image is beamed using a laser or light-emitting diodes (LEDs) onto a positively charged selenium-coated, photoconductive drum, thereby canceling the charge and leaving a positively charged copy of the original image. A negatively charged toner is attracted to the positive image on the drum. The toner is then attracted to the substrate (e.g., paper), which is also positively charged. Heat and/or pressure or light is then used to fuse the toner thereby causing it to permanently adhere to the substrate. Receiver sheets used in xerographic printers and presses utilizing heat and pressure fusing may be exposed to temperatures ranging from about 140° C. to about 250° C.

Conventional receiver sheets used in xerographic (dry toner) printers and presses typically employ uncharged substrates prepared from epoxy or acrylic resins, which are coated with charged polymeric coatings.

The highly cationic nature and low thermal stability of conventional digital offset receiving sheets render these sheets unsuitable for use in xerographic (dry toner) printers and presses utilizing heat and pressure fusing.

Moreover, receiver sheets for xerographic (dry toner) printers and presses exhibit low adhesion to liquid toners due in part to the absence of charge in the substrates used in these receiver sheets, thereby rendering them unsuitable for use in digital offset printing presses.

It is an object of the present invention to address these limitations in prior art receiver sheets by providing a receiver sheet that is suitable for use in both digital offset printing presses and xerographic (dry toner) printers and presses.

SUMMARY OF THE INVENTION

The present invention therefore provides a coating formulation for use in preparing a receiver sheet for digital offset and xerographic printing, which comprises fine inorganic or organic particles having a number average particle size ranging from about 5 to about 500 nanometers, at least one film forming binder, and one or more surfactants, foam controlling agents, and wax additives, wherein the dry weight ratio of fine particles to film forming binder(s) ranges from about 15:1 to about 1:1.

The present invention also provides a receiver sheet for digital offset and xerographic printing the receiver sheet comprising a substrate having opposing surfaces and at least one microporous toner receiving layer formed on at least one surface of the substrate, wherein the microporous toner receiving layer(s) is prepared from the coating formulation described hereinabove.

In one contemplated embodiment of the inventive receiver sheet, a microporous toner receiving layer is formed on one surface of the substrate, while the opposing surface of the substrate is adhered to a relatively rigid support layer.

Other features and advantages of the invention will be apparent to one of ordinary skill from the following detailed description and drawing. Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BEST MODE FOR CARRYING OUT THE INVENTION

Figure 1:
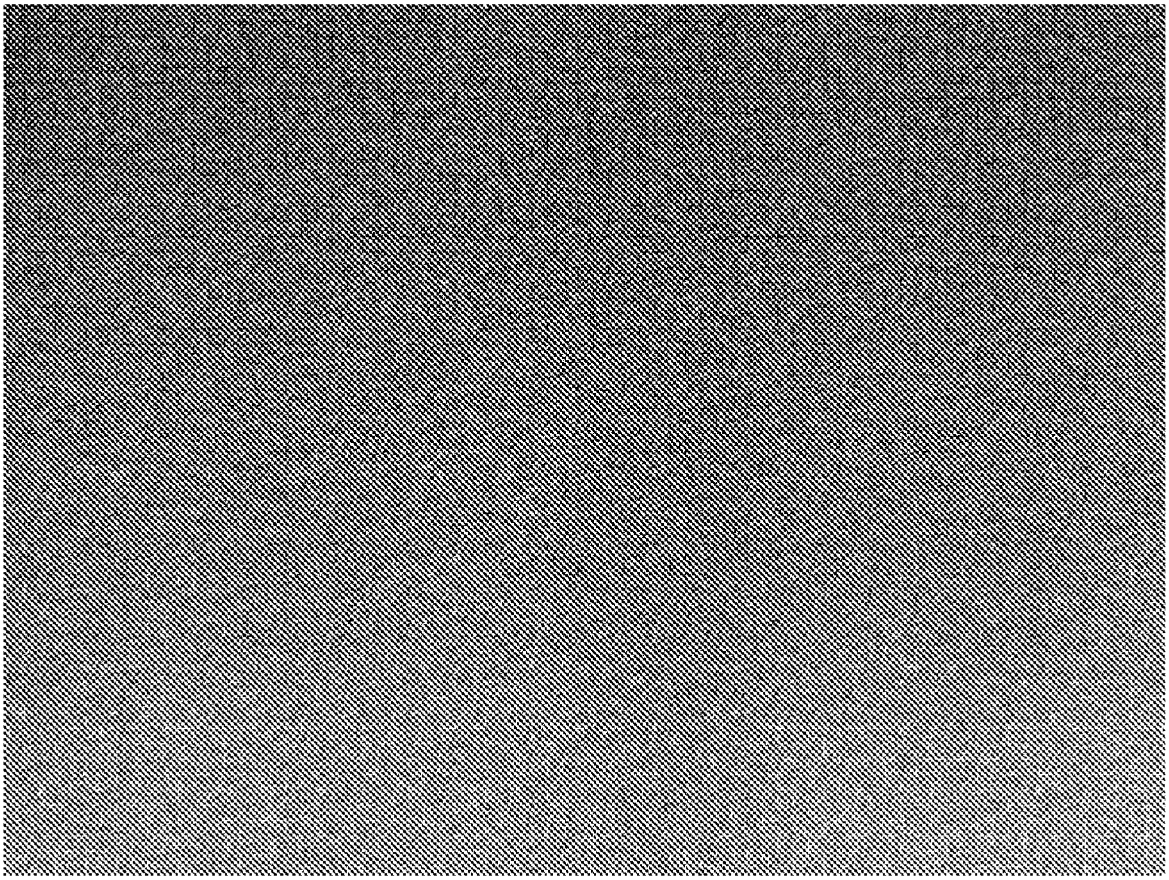
FIG. 1 is a microscopic photograph of a surface of the microporous toner receiving layer of one embodiment of the dual purpose receiver sheet of the present invention as obtained by observing it through a scanning microscope at 2700× magnification.

The dual purpose receiver sheet of the present invention is capable of being imaged using digital offset printing presses and xerographic (dry toner) printers and presses. By way of the present invention, it has been discovered that the use of toner receiving layers prepared from fine particles in combination with at least one film forming binder within the above-referenced ratio range will produce a dual purpose receiver sheet with a microporous toner receiving layer(s) that will exhibit good heat stability (at temperatures ranging from about 140° C. to about 250° C.) and good to excellent adhesion to both liquid toners used in digital offset presses and dry toners used in xerographic printing systems.

The substrate or support used to prepare the dual purpose receiver sheet of the present invention may be opaque, translucent, or transparent depending upon the intended application.

Preferably, the substrate is selected from the group of optionally metallized polyethylene (PE), polyethylene terephthalate (PET), polypropylene (PP) and polyvinyl chloride (PVC) films, and metallized papers. More preferably, the substrate is a PET film, a PP film, or metallized paper.

The thickness of the substrate can be liberally selected according to the intended application, and is generally from about 25 to about 500 microns (μ), and preferably from about 50 to about 250μ.

The substrate may be pre-treated with an adhesion-promoting primer layer (e.g., an acrylic adhesion-promoting primer layer) prior to application of the coating formulation for the toner receiving layer(s).

As noted above, the coating formulation used to prepare the toner receiving layer(s) of the dual purpose receiver sheet of the present invention comprises fine inorganic or organic particles, at least one film forming binder, and one or more surfactants, foam controlling agents, and wax additives, wherein the dry weight ratio of fine particles to film forming binder(s) ranges from about 15:1 to about 1:1.

The fine inorganic or organic particles have a number average particle size ranging from about 5 to about 500 nanometers. The phrase "number average particle size" as used herein is intended to cover not only primary particles but agglomerates.

The toner receiving layer(s) of the present invention preferably has a gloss level ranging from 10 to 70 at 60 degrees. Considering that the level of gloss depends largely upon the smoothness of the toner receiving layer(s), it is preferred in the present invention that the number average particle size of the fine organic or inorganic particles range from about 5 to about 90 nanometers, and it is more preferred that the number average particle size of these particles range from about 5 to about 30 nanometers.

Examples of fine inorganic particles include metal oxides such as colloidal silica, cupric oxide, metal salts such as calcium carbonate, and clays.

Examples of fine organic particles include particles of acrylic resins.

In a preferred embodiment, the fine particles are colloidal silica, which are available in the form of a dispersion from W.R. Grace & Co.—Conn., 7500 GRACE DR. Columbia, Md. 21044, under the trade designation LUDOX AM colloidal silica dispersion.

The binder used in the coating formulation of the present invention is a polymer which will form a continuous film upon drying. Particularly useful polymers are acrylic polymers, polyurethanes, and urethane/acrylic copolymers.

In one preferred embodiment, the binder is a film forming waterborne aliphatic urethane/acrylic copolymer, which is available from DSM NeoResins, 730 Main Street, Wilmington, Mass. 01887-3386, under the trade designation NEOPAC R-9000 waterborne aliphatic urethane/acrylic copolymer.

In another preferred embodiment, the binder is a film forming acrylic emulsion, which is available from BASF Corporation (formally Johnson Polymer), 8310 16th St. Sturtevant Wis. 53177-0902, under the trade designation JONCRYL 77 film forming acrylic emulsion.

The dry weight ratio of fine particles to film forming binder(s) in the toner receiving layer(s) of the dual purpose receiver sheet of the present invention ranges from about 15:1 to about 1:1. The present inventors have found that if the fine particles/film forming binder(s) dry weight ratio exceeds 15:1 (i.e., the fine particles are present in an amount which is greater than 93% of the amount of solids), brittleness and cracking in the toner receiving layer(s) will be observed, while if the dry weight ratio falls below 1:1 (i.e. the fine particles are present in an amount which is less than 50% of the amount of solids), a marked reduction in the amount of liquid or dry toner being accepted by this layer(s) will be observed.

Preferably, the dry weight ratio of fine particles to film forming binder(s) ranges from about 5:1 to about 1:1, and more preferably ranges from about 3:1 to about 1:1.

In addition to the above components, the coating formulation for the toner receiving layer(s) of the present invention contains one or more surfactants, foam controlling agents, and wax additives.

Suitable surfactants include, but are not limited to, nonionic fluorosurfactants, surfactants based on acetylenic alcohol, dio and glycol chemistry, and mixtures thereof. In one preferred embodiment, the surfactant is a nonionic fluorosurfactant, while in another preferred embodiment, the surfactant is a mixture of a nonionic fluorosurfactant and an acetylene glycol-based surfactant. Nonionic fluorosurfactants are available from E.I. du Pont de Nemours and Co., 1007 Market Street, Wilmington Del. 19898, under the trade designation ZONYL FSN nonionic fluorosurfactant, while acetylene glycol-based surfactants are available from Air Products and Chemicals Inc., 7201 Hamilton Blvd. Allentown Pa. 18195 ("Air Products"), under the trade designation SURFYNOL 465 surfactant.

Suitable foam controlling agents include both nonionic (e.g., acetylenic foam controlling agents and water-based wax/higher fatty acid ester emulsions) and ionic foam controlling agents. Acetylenic foam controlling agents are available from Air Products under the trade designation SURFYNOL DF-110L nonionic defoamer, while water-based wax/higher fatty acid ester emulsions are available from Miki Sangyo, San Nopco Limited, 747 Third Avenue, New York, N.Y. 10017, under the trade designation NOPCO 1407-K defoaming agent.

Suitable wax additives include, but are not limited to, polyethylene wax emulsions and polyethylene/paraffin wax emulsions. Polyethylene wax emulsions are available from BYK-Chemie U.S.A. Inc., Plastics Div., P.O. Box 5670, 524 S. Cherry Street, Wallingford, Conn. 06492, under the trade designation AQUACER 513 polyethylene wax emulsion, and from BASF Corporation (formally Johnson Polymer), under the trade designation JONWAX 26 polyethylene wax emulsion.

In addition to the above components, the coating formulation for the toner receiving layer(s) of the present invention can advantageously contain other additives such as whitening agents (e.g., fluorescent whitening agents), antioxidants, antistatic agents, crosslinking agents, slip agents, synthetic pigments, ultraviolet (UV) absorbers, and wetting agents, provided any such additive does not adversely impact upon the desirable properties of the toner receiving layer(s).

In one contemplated embodiment, the coating formulation used to prepare the toner receiving layer(s) comprises:

(a) from about 49 to about 80% by weight, based on the total dry weight of the coating formulation, of a colloidal silica dispersion, the silica particles in the dispersion having a number average particle size ranging from about 5 to about 90 nanometers;

(b) from about 15 to about 49% by weight, based on the total dry weight of the coating formulation, of a film forming waterborne aliphatic urethane/acrylic copolymer binder, wherein, the silica/film forming binder dry weight ratio ranges from about 5:1 to about 1:1, (c) from about 0.05 to about 3.0% by weight, based on the total dry weight of the coating formulation, of an about 1:3 to about 1:1 mixture of a nonionic fluorosurfactant and an acetylene glycol-based surfactant;

(d) from about 0.05 to about 1.0% by weight, based on the total dry weight of the coating formulation, of one or more foam controlling agents;

(e) from about 1.0 to about 5.0% by weight, based on the total dry weight of the coating formulation, of one or more wax additives;

(f) from about 0.1 to about 1.0% by weight, based on the total dry weight of the coating formulation, of one or more whitening agents; and (g) from about 55 to about 95% by weight, based on the total dry weight of the coating formulation, of water, wherein, the sum of components (a)-(g) total 100% by weight.

In another contemplated embodiment, the inventive coating formulation comprises:

(a) from about 49 to about 80% by weight, based on the total dry weight of the coating formulation, of a colloidal silica dispersion, the silica particles in the dispersion having a number average particle size ranging from about 5 to about 90 nanometers;

(b) from about 15 to about 49% by weight, based on the total dry weight of the coating formulation, of a film forming acrylic emulsion binder, wherein, the silica/film forming binder dry weight ratio ranges from about 5:1 to about 1:1, (c) from about 0.05 to about 1.0% by weight, based on the total dry weight of the coating formulation, of a nonionic fluorosurfactant;

(d) from about 0.05 to about 1.0% by weight, based on the total dry weight of the coating formulation, of one or more foam controlling agents;

(e) from about 1.0 to about 5.0% by weight, based on the total dry weight of the coating formulation, of one or more wax additives;

(f) from about 55 to about 95% by weight, based on the total dry weight of the coating formulation, of water, wherein, the sum of components (a)-(f) total 100% by weight.

The inventive coating formulation is made by mixing the components with water so as to obtain an aqueous composition having a solids content ranging from about 5 to about 40%, preferably from about 10 to about 20%.

The prepared coating formulation is applied to the substrate so as to achieve a preferred average coat weight that ranges from about 0.7 to about 3.3 grams per square meter ($g/m^2$), more preferably, from about 0.7 to about 1.7 $g/m^2$, based on the total dry weight of the coating formulation. The coating formulation may be applied using e.g., air knife coaters, rod coaters or gravure coaters. Drying can be accomplished by any known method or technique including room temperature air drying, hot air drying, heating surface-contact drying or heat radiation drying.

As best shown in FIG. 1, the toner receiving layer(s) that is prepared using the coating formulation described above is realized in the form of a microporous thin film, the micropores being formed or defined by the spacing between the fine particles in the toner receiving layer(s). As will be readily appreciated by those skilled in the art, when the dual purpose receiver sheet of the present invention is imaged using a digital offset or xerographic printer, the dry or liquid toner is more effectively received and retained by being drawn into the voids contained in this toner receiving layer(s).

The dual purpose receiver sheet of the present invention may include additional layers or coatings, provided any such layer or coating does not interfere With the ability of the inventive sheet to effectively image on both digital offset and xerographic printers.

In one contemplated embodiment of the inventive receiver sheet, a toner receiving layer is formed on one surface of a polymeric substrate, and a relatively rigid support layer is adhered to an opposing side of the substrate.

The subject invention and its suitability for both digital offset and xerographic printing will now be described and shown by reference to the following illustrative examples.

WORKING EXAMPLES

Components Used

In the Working Examples set forth below, the following components and materials were used:

| | |
|---|---|
| SILICA | a colloidal silica dispersion at 30% solids having a pH of from 8.6 to 9.3 and a surface area of from about 198 to 258 $m^2/g$, supplied by W. R. Grace & Co. under the trade designation LUDOX AM. |
| FILM FORMING BINDER I | a film forming waterborne aliphatic urethane/acrylic copolymer at 40% solids, supplied by DSM NeoResins under the trade designation NEOPAC R-9000. |
| FILM FORMING BINDER II | a film forming acrylic emulsion at 46% solids, supplied by BASF Corporation (formally Johnson Polymer) under the trade designation JONCRYL 77 film forming acrylic emulsion. |
| NON-FILM FORMING BINDER | a non-film forming acrylic emulsion at 48% solids, supplied by BASF Corporation (formally Johnson Polymer) under the trade designation JONCRYL 89 non-film forming acrylic emulsion. |
| SURFACTANT I | a nonionic fluorosurfactant, supplied by E. I. du Pont de Nemours and Co. under the trade designation ZONYL FSN nonionic fluorosurfactant. |
| SURFACTANT II | an acetylene glycol-based surfactant, supplied by Air Products under the trade designation SURFYNOL 465 surfactant. |
| FOAM CONTROLLING AGENT I | a water-based wax/higher fatty acid ester emulsion at 15% solids, supplied by Miki Sangyo, San Nopco Limited, under the trade designation NOPCO 1407-K defoaming agent. |
| FOAM CONTROLLING AGENT II | a nonionic foam controlling agent, supplied by Air Products under the trade designation SURFYNOL DF-110L nonionic defoamer. |
| WAX ADDITIVE I | a polyethylene wax emulsion at 35% solids, supplied by BYK-Chemie U.S.A. Inc. under the trade designation AQUACER 513 polyethylene wax emulsion. |
| WAX ADDITIVE II | a polyethylene wax emulsion at 26% solids, supplied by BASF Corporation (formally Johnson Polymer) under the trade designation JONWAX 26 polyethylene wax emulsion. |
| FWA | a stilbene fluorescent whitening agent marketed by Ciba Specialty, supplied as a water based solution at 29% solids, under the trade designation TINOPAL ABP-A. |
| SUBSTRATE | a 4 mil white polyester film sold by SKC Films, Inc., 1000 SKC Drive, Covington, GA, under the trade designation SKYROL SW-84G. |

Sample Preparation

The aqueous coating formulations described below In Table A were each prepared by combining the noted quantity of each component in a mixing vessel followed by stirring with a mixer (LIGHTNIN Mixer, Model #CM31D20NZ1C) at moderate speed for 15 minutes. Each resulting mixture was then used to form a toner receiving layer on a 4 mil white polyester film (SUBSTRATE) by applying each mixture to a separate SUBSTRATE with a number 4 Mayor rod to form a toner receiving layer having a coat weight of about 1.34 $g/m^2$, and then placing the coated SUBSTRATE in a laboratory Blue M convection oven and drying the coated SUBSTRATE at 50° C. for 2 minutes.

TABLE A

Coating Formulations for Toner Receiving Layer

| Components | Example 1 % solids | Example 1 % by weight | Example 2 % solids | Example 2 % by weight | Comparative Example 1 % solids | Comparative Example 1 % by weight |
|---|---|---|---|---|---|---|
| SILICA | 10.5 | 35.0 | 9.75 | 32.50 | 10.5 | 35.0 |
| FILM FORMING BINDER I | 4.5 | 11.25 | | | | |
| FILM FORMING BINDER II | | | 5.25 | 11.41 | | |
| NON-FILM FORMING BINDER | | | | | 4.5 | 9.38 |
| SILICA/BINDER RATIO | 3.1:1 | | 2.9:1 | | 3.7:1 | |
| SURFACTANT I | 0.04 | 0.10 | 0.04 | 0.10 | 0.04 | 0.10 |
| SURFACTANT II | 0.10 | 0.10 | | | | |
| FOAM CONTROLLING AGENT I | 0.02 | 0.10 | | | 0.02 | 0.10 |
| FOAM CONTROLLING AGENT II | | | 0.02 | 0.10 | | |
| WAX ADDITIVE I | 0.20 | 0.57 | 0.20 | 0.57 | 0.20 | 0.57 |
| WAX ADDITIVE II | | | 0.30 | 1.15 | 0.30 | 1.15 |
| FWA | 0.04 | 0.17 | | | | |
| WATER | 0 | 52.71 | 0 | 54.71 | 0 | 53.70 |
| Total | 15.41 | 100.00 | 15.56 | 100.00 | 5.56 | 100.00 |

Test Methods

The coated SUBSTRATES or test samples were then subjected to several evaluation tests. A Hewlett Packard Color LaserJet 3550 Printer and a Hewlett Packard Indigo ws4050 Digital Press were used in conjunction with these tests. The printer and the press were used to print images on the test samples using four colors, namely—black, yellow, cyan and magenta. The Hewlett Packard Color LaserJet 3550 Printer was set at Tough Paper print mode, while the Hewlett Packard Indigo ws4050 Digital Press was calibrated to the thickness of the SUBSTRATE, prior to printing images on the test samples.

The tests and standards used to evaluate the imaged test samples are described below.

Print Quality. The visual uniformity of the imaged areas of each test sample was evaluated and rated as set forth below:

| Rating | Print Quality |
|---|---|
| Very Good | uniform printed areas |
| Good | substantially uniform printed areas |
| Moderate | minor non-uniformity and/or printed colors had a dull gloss level when compared to the gloss level of unprinted areas |
| Poor | non-uniformity in printed areas and/or dull gloss level in two or more printed areas. |

Waterfastness. The prepared test samples were tested for waterfastness by (1) immersing each imaged test sample in tap water for ten minutes, (2) removing excess water from each sample using a paper towel, (3) aggressively rubbing the coated surface of each test sample ten (10) times in one direction, and (4) visually inspecting and rating the coatings on each test sample. The visual appearance of the coatings after waterfastness testing was rated as set forth below:

| Rating | Visual Waterfastness |
|---|---|
| Very Good | minimal to no coating erosion. |
| Good | low coating erosion. |
| Moderate | moderate coating erosion. |
| Poor | clear reduction in coating thickness or loss of coating. |

Coating Adhesion. The prepared test samples were tested for coating adhesion by adhering a 2.54 centimeter (cm)×15.24 cm strip of 3M 610 tape to the coated surface of each test sample with a 2.27 kilogram (Kg) weighted roller, and then manually pulling the strip off with moderate speed at a 90° angle. The level of adhesion was then evaluated and rated as set forth below:

| Rating | Coating Adhesion |
|---|---|
| Very Good | minimal to no coating loss |
| Good | low amount of coating loss |
| Moderate | moderate coating loss |
| Poor | clear loss of coating |

Toner Adhesion. The prepared test samples were tested for toner adhesion by adhering a 2.54 cm×15.24 cm strip of 3M 610 tape to each of the four primary toners with a 2.27 Kg weighted roller, and then manually pulling each strip off with moderate speed at a 90° angle. The level of adhesion was then evaluated and rated as set forth below:

| Rating | Toner Adhesion |
|---|---|
| Excellent | 100% retained image |
| Good | ~85% retained image |
| Moderate | 75%-80% retained image |
| Poor | less than 70% retained image |

Summary of Examples 1 and 2 and Comparative Example 1

The results of the print quality, waterfastness, coating adhesions and toner adhesion evaluations or tests are summarized in Table 1 below.

TABLE 1

Summary of Examples 1 and 2 and Comparative Example 1

| | Example 1 | Example 2 | Comparative Example 1 |
|---|---|---|---|
| HP LaserJet 3550 | | | |
| Print Quality | Good | Moderate to Good | Moderate |
| Waterfastness | Very Good | Very Good | Very Good |
| Coating Adhesion | Very Good | Very Good | Moderate |
| Toner Adhesion | Excellent | Good | Moderate to Poor |
| HP Indigo ws4050 | | | |
| Print Quality | Very Good | Very Good | Very Good |
| Waterfastness | Very Good | Very Good | Very Good |
| Coating Adhesion | Very Good | Very Good | Moderate |
| Toner Adhesion | Excellent | Good | Poor |

Examples 1 and 2 generally demonstrate that the receiver sheets of the present invention, which were prepared from coating formulations employing fine particles and film forming binders, the fine particle to film forming binder dry weight ratio being about 3:1, may be successfully imaged by both digital offset and xerographic printers and presses. These samples demonstrated moderate to very good print quality, very good waterfastness, very good coating adhesion, and good to excellent toner adhesion, while comparative example 1, which employed a non-film forming binder demonstrated only moderate print quality on the HP LaserJet 3550, and only moderate to poor coating and toner adhesion regardless of whether it was imaged on the HP LaserJet 3550 or the HP Indigo ws4050.

While various embodiments of the present invention have been described above, it should be understood that they have been presented by way of example only, and not limitation. Thus, the breadth and scope of the present invention should not be limited by any of the exemplary embodiments.

Having thus described the invention, what is claimed is:

1. A coating formulation for use in preparing a microporous toner receiving layer for digital offset and xerographic printing, which comprises a major amount of fine colloidal silica particles having a number average particle size ranging from about 5 to about 500 nanometers, a minor amount of at least one film forming binder, one or more surfactants, one or more foam controlling agents, and one or more wax additives, wherein a dry weight ratio of the fine colloidal silica particles to the film forming binder(s) ranges from about 15:1 to about 1:1.

2. The coating formulation of claim 1, wherein the fine colloidal silica particles have a number average particle size ranging from about 5 to about 90 nanometers.

3. The coating formulation of claim 2, wherein the fine colloidal silica particles have a number average particle size ranging from about 5 to about 30 nanometers.

4. The coating formulation of claim 1, wherein the film forming binder(s) is selected from the group consisting of acrylic polymers, polyurethanes, urethane/acrylic copolymers, and combinations thereof.

5. The coating formulation of claim 1, wherein the dry weight ratio of the fine colloidal silica particles to the film forming binder(s) ranges from about 5:1 to about 1:1.

6. The coating formulation of claim 5, wherein the dry weight ratio of the fine colloidal silica particles to the film forming binder(s) ranges from about 3:1 to about 1:1.

7. A coating formulation for use in preparing a microporous toner receiving layer for digital offset and xerographic printing, which comprises a major amount of fine colloidal silica particles having a number average particle size ranging from about 5 to about 500 nanometers, a minor amount of at least one film forming binder, one or more surfactants, one or more foam controlling agents, and one or more wax additives, wherein a dry weight ratio of the fine colloidal silica particles to the film forming binder(s) ranges from about 15:1 to about 1:1, and wherein the surfactant(s) is selected from the group consisting of nonionic fluorosurfactants, surfactants based on acetylenic alcohol, diol and glycol chemistry, and mixtures thereof.

8. A coating formulation for use in preparing a microporous toner receiving layer for digital offset and xerographic printing, which comprises a major amount of fine colloidal silica particles having a number average particle size ranging from about 5 to about 500 nanometers, a minor amount of at least one film forming binder, one or more surfactants, one or more foam controlling agents, and one or more wax additives, wherein a dry weight ratio of the fine colloidal silica particles to the film forming binder(s) ranges from about 15:1 to about 1:1, and wherein the foam controlling agent(s) is a nonionic foam controlling agent(s).

9. A coating formulation for use in preparing a microporous toner receiving layer for digital offset and xerographic printing, which comprises a major amount of fine colloidal silica particles having a number average particle size ranging from about 5 to about 500 nanometers, a minor amount of at least one film forming binder, one or more surfactants, one or more foam controlling agents, and one or more wax additives, wherein a dry weight ratio of the fine colloidal silica particles to the film forming binder(s) ranges from about 15:1 to about 1:1, and wherein the wax additive(s) is selected from the group consisting of polyethylene wax emulsions and polyethylene/paraffin wax emulsions.

10. A coating formulation for use in preparing a microporous toner receiving layer for digital offset and xerographic printing, which comprises:

(a) from about 49 to about 80% by weight, based on the total dry weight of the coating formulation, of a colloidal silica dispersion, the silica particles in the dispersion having a number average particle size ranging from about 5 to about 90 nanometers;

(b) from about 15 to about 49% by weight, based on the total dry weight of the coating formulation, of a film forming waterborne aliphatic urethane/acrylic copolymer binder, wherein, the silica/film forming binder dry weight ratio ranges from about 5:1 to about 1:1, (c) from about 0.05 to about 3.0% by weight, based on the total dry weight of the coating formulation, of an about 1:3 to about 1:1 mixture of a nonionic fluorosurfactant and an acetylene glycol-based surfactant;

(d) from about 0.05 to about 1.0% by weight, based on the total dry weight of the coating formulation, of one or more foam controlling agents;

(e) from about 1.0 to about 5.0% by weight, based on the total dry weight of the coating formulation, of one or more wax additives;

(f) from about 0.1 to about 1.0% by weight, based on the total dry weight of the coating formulation, of one or more whitening agents; and (g) from about 55 to about 95% by weight, based on the total weight of the coating formulation, of water.

11. A coating formulation for use in preparing a microporous toner receiving layer for digital offset and xerographic printing, which comprises:

(a) from about 49 to about 80% by weight, based on the total dry weight of the coating formulation, of a colloidal silica dispersion, the silica particles in the dispersion having a number average particle size ranging from about 5 to about 90 nanometers;

(b) from about 15 to about 49% by weight, based on the total dry weight of the coating formulation, of a film forming acrylic emulsion binder, wherein, the silica/film forming binder dry weight ratio ranges from about 5:1 to about 1:1, (c) from about 0.05 to about 1.0% by weight, based on the total dry weight of the coating formulation, of a nonionic fluorosurfactant;

(d) from about 0.05 to about 1.0% by weight, based on the total dry weight of the coating formulation, of one or more foam controlling agents;

(e) from about 1.0 to about 5.0% by weight, based on the total dry weight of the coating formulation, of one or more wax additives;

(f) from about 55 to about 95% by weight, based on the total weight of the coating formulation, of water.

12. A coating formulation for use in preparing a receiver sheet for digital offset and xerographic printing, which comprises from about 49 to about 80% by weight, based on the total dry weight of the coating formulation, of fine colloidal silica particles having a number average particle size ranging from about 5 to about 500 nanometers, from about 15 to about 49% by weight, based on the total dry weight of the coating formulation, of at least one film forming binder, and from about 2 to about 5% by weight, based on the total dry weight of the coating formulation, of one or more surfactants, one or more foam controlling agents, and one or more wax additives, wherein a dry weight ratio of the fine colloidal silica particles to the film forming binder(s) ranges from about 15:1 to about 1:1.

13. A coating formulation, which comprises a major amount of fine colloidal silica particles having a number average particle size ranging from about 5 to about 500 nanometers, a minor amount of at least one film forming binder, one or more surfactants, one or more foam controlling agents, and one or more wax additives, wherein a dry weight ratio of the fine colloidal silica particles to the film forming binder(s) ranges from about 15:1 to about 1:1, wherein the coating formulation is suitable for use as an outermost toner receiving layer for digital offset and xerographic printing.

14. The coating formulation of claim 13, wherein the wax additive(s) is selected from the group consisting of polyethylene wax emulsions and polyethylene/paraffin wax emulsions.

15. A coating formulation for use in preparing a microporous toner receiving layer for digital offset and xerographic printing, which comprises a major amount of fine colloidal silica particles having a number average particle size ranging from about 5 to about 500 nanometers, a minor amount of at least one film forming binder, and one or more components selected from the group consisting of surfactants, foam controlling agents, and wax additives, wherein a dry weight ratio of the fine colloidal silica particles to the film forming binder(s) ranges from about 15:1 to about 1:1, and wherein the film forming binder(s) is a urethane/acrylic copolymer binder.

16. The coating formulation of claim 12, wherein the film forming binder(s) is selected from the group consisting of acrylic polymers, polyurethanes, urethane/acrylic copolymers, and combinations thereof.

17. A coating formulation for use in preparing a receiver sheet for digital offset and xerographic printing, which comprises from about 49 to about 80% by weight, based on the total dry weight of the coating formulation, of fine colloidal silica particles having a number average particle size ranging from about 5 to about 500 nanometers, from about 15 to about 49% by weight, based on the total dry weight of the coating formulation, of at least one film forming binder, and from about 2 to about 5% by weight, based on the total dry weight of the coating formulation, of one or more components selected from the group consisting of surfactants, foam controlling agents, and wax additives, wherein a dry weight ratio of the fine colloidal silica particles to the film forming binder(s) ranges from about 15:1 to about 1:1, and wherein the film forming binder(s) is a urethane/acrylic copolymer binder.

18. A coating formulation for use in preparing a microporous toner receiving layer for digital offset and xerographic printing, which consists essentially of fine colloidal silica particles having a number average particle size ranging from about 5 to about 500 nanometers, a minor amount of at least one film forming binder, one or more surfactants, one or more foam controlling agents, and one or more wax additives, and optionally, one or more whitening agents and water, wherein a dry weight ratio of the fine colloidal silica particles to the film forming binder(s) ranges from about 15:1 to about 1:1.

19. The coating formulation of claim 18, wherein the film forming binder(s) is selected from the group consisting of acrylic polymers, polyurethanes, urethane/acrylic copolymers, and combinations thereof.

20. A coating formulation for use in preparing a microporous toner receiving layer for digital offset and xerographic printing, which consists essentially of fine colloidal silica particles having a number average particle size ranging from about 5 to about 500 nanometers, a minor amount of at least one film forming binder, one or more components selected from the group consisting of surfactants, foam controlling agents, and wax additives, and optionally, one or more whitening agents and water, wherein a dry weight ratio of the fine colloidal silica particles to the film forming binder(s) ranges from about 15:1 to about 1:1, and wherein the film forming binder(s) is a urethane/acrylic copolymer binder.

21. A coating formulation for use in preparing a microporous toner receiving layer for digital offset and xerographic printing, which comprises fine colloidal silica particles having a number average particle size ranging from about 5 to about 500 nanometers, a minor amount of at least one film forming urethane/acrylic copolymer binder, and one or more components selected from the group consisting of surfactants, foam controlling agents, and wax additives, wherein a dry weight ratio of the fine colloidal silica particles to the film forming binder(s) ranges from about 15:1 to about 1:1.

22. A method of using a coating formulation, wherein the coating formulation comprises fine colloidal silica particles having a number average particle size ranging from about 5 to about 500 nanometers, a minor amount of at least one film forming binder, one or more surfactants, one or more foam controlling agents, and one or more wax additives, wherein a dry weight ratio of the fine colloidal silica particles to the film forming binder(s) ranges from about 15:1 to about 1:1, wherein the method comprises using the coating formulation to prepare a microporous toner receiving layer for digital offset and xerographic printing.

* * * * *